(12) United States Patent
Lin et al.

(10) Patent No.: US 10,194,150 B2
(45) Date of Patent: Jan. 29, 2019

(54) METHOD AND DEVICE FOR CODING IMAGE, AND METHOD AND DEVICE FOR DECODING IMAGE

(71) Applicants: TONGJI UNIVERSITY, Shanghai (CN); ZTE Corporation, Shenzhen (CN)

(72) Inventors: Tao Lin, Shanghai (CN); Ming Li, Shenzhen (CN); Guoqiang Shang, Shenzhen (CN)

(73) Assignees: TONGJI UNIVERSITY, Shanghai (CN); ZTE CORPORATION, Shenzhen (CN)

( * ) Notice: Subject to any disclaimer, the term of this patent is extended or adjusted under 35 U.S.C. 154(b) by 210 days.

(21) Appl. No.: 15/108,614

(22) PCT Filed: Dec. 29, 2014

(86) PCT No.: PCT/CN2014/095390
§ 371 (c)(1),
(2) Date: Sep. 28, 2016

(87) PCT Pub. No.: WO2015/096822
PCT Pub. Date: Jul. 2, 2015

(65) Prior Publication Data
US 2017/0013261 A1    Jan. 12, 2017

(30) Foreign Application Priority Data

Dec. 28, 2013 (CN) .......................... 2013 1 0735480
Dec. 25, 2014 (CN) .......................... 2014 1 0844195

(51) Int. Cl.
*H04N 19/124*    (2014.01)
*H04N 19/46*    (2014.01)
(Continued)

(52) U.S. Cl.
CPC ......... *H04N 19/124* (2014.11); *H04N 19/146* (2014.11); *H04N 19/154* (2014.11);
(Continued)

(58) Field of Classification Search
CPC .. H04N 19/124; H04N 19/146; H04N 19/154; H04N 19/176; H04N 19/46; H04N 19/70
See application file for complete search history.

(56) References Cited

U.S. PATENT DOCUMENTS

2007/0071094 A1* 3/2007 Takeda ................. H04N 19/197
375/240.04
2007/0160129 A1    7/2007 Fujisawa

FOREIGN PATENT DOCUMENTS

CN    1941915 A    4/2007
CN    101194518 A    6/2008
(Continued)

OTHER PUBLICATIONS

International Search Report for corresponding application PCT/CN2014/095390 filed on Dec. 29, 2014; dated Mar. 27, 2015.
(Continued)

*Primary Examiner* — Thai Q Tran
*Assistant Examiner* — Christopher Braniff
(74) *Attorney, Agent, or Firm* — Cantor Colburn LLP

(57) ABSTRACT

Provided are a method and device for coding an image, a method and device for decoding an image. The method for coding the image includes that: coding mode parameters and parameter groups of one coding block are divided into multiple types of coding mode parameters and parameter groups corresponding to the multiple types of coding mode parameters according to a specified rule respectively; Quantization Parameters (QPs) included in the multiple types of coding mode parameters are determined according to a preset target bit rate; a QP of the coding block is determined
(Continued)

according to reconstruction quality for the coding block; a coding mode parameter to be used is selected from the multiple types of coding mode parameters according to the QP of the coding block, a parameter group corresponding to the selected coding mode parameter is set, and a QP difference is calculated; and the coding mode parameter, the parameter group used by the coding block and the QP difference are written into a video bitstream.

24 Claims, 7 Drawing Sheets

(51) Int. Cl.
  *H04N 19/154* (2014.01)
  *H04N 19/176* (2014.01)
  *H04N 19/70* (2014.01)
  *H04N 19/146* (2014.01)

(52) U.S. Cl.
  CPC ........... *H04N 19/176* (2014.11); *H04N 19/46* (2014.11); *H04N 19/70* (2014.11)

(56) References Cited

FOREIGN PATENT DOCUMENTS

| | | |
|---|---|---|
| CN | 101572817 A | 11/2009 |
| CN | 102714722 A | 10/2012 |
| KR | 20010069016 A | 7/2001 |

OTHER PUBLICATIONS

EP Search Report dated Nov. 10, 2016, EP Application No. 1483134. 2, 7 pages.
Wiegand, "Draft ITU-T Recommendation and Final Draft International Standard of Joint Video Specification (ITU-T Rec. H.2641 ISO/IEC 14496-10 AVC)", Draft ISO/IEC 14496-10 : 2002 (E), 8th Meeting: Geneva, CH, May 23-27, 2003, 269 pages.

* cited by examiner

METHOD AND DEVICE FOR CODING IMAGE, AND METHOD AND DEVICE FOR DECODING IMAGE

TECHNICAL FIELD

The present disclosure relates to the field of communication, and in particular to a method and device for coding an image, and a method and device for decoding an image.

BACKGROUND

A common format of a digital video signal is a sequence of the images (or pictures). An image is usually a rectangular area formed by a plurality of pixels, and a digital video signal is a video image sequence, which is also called a video sequence or a sequence sometimes for short, formed by dozens of and even tens of thousands of frames of images. Coding the digital video signal is to code each image (or picture).

In the latest international High Efficiency Video Coding (HEVC) standard, when an image is coded, the image is divided into a plurality of sub-images called "Coding Elements (CUs)" with M×M pixels, and the sub-images are coded one by one by taking a CU as a basic coding element. M is usually 8, 16, 32 and 64. Therefore, coding a video image sequence is to sequentially code each CU. Similarly, during decoding, each CU is also sequentially decoded to finally reconstruct the whole video sequence.

In order to adapt to differences of image contents and characteristics of each part in an image, and pertinently and most effectively to perform coding, a size of each CU in the image may be different, some being 8×8, some being 64×64 and the like. In order to seamlessly splice the CUs with different sizes, the image is usually divided into "Largest Coding Units (LCUs)" with completely the same size and N×N pixels at first, and then each LCU is further divided into multiple CUs of which sizes may not be the same in a tree structure. Therefore, the LCU is also called Coding Tree Unit (CTU). For example, the image is divided into LCUs with completely the same size and 64×64 pixels (N=64) at first, wherein a certain LCU includes three CUs with 32×32 pixels and four CUs with 16×16 pixels, and in such a manner, the 7 CUs in the tree structure form a CTU; the other LCU includes two CUs with 32×32 pixels, three CUs with 16×16 pixels and twenty CUs with 8×8 pixels, and in such a manner, the 25 CUs in the tree structure form the other CTU. Coding an image is to sequentially code CUs one by one.

A colour pixel includes three components. Two most common pixel colour formats include a Green, Blue and Red (GBR) colour format (including a green component, a blue component and a red component) and a YUV colour format, also called a YCbCr colour format (including a luma component and two chroma components). Therefore, when a CU is coded, the CU may be divided into three component planes (a G plane, a B plane and an R plane or a Y plane, a U plane and a V plane), and the three component planes are coded respectively; and three components of each pixel may also be bundled and combined into a triple, and the whole CU formed by these triples is coded. The former pixel and component arrangement manner is called a planar format of an image (and CUs of the image), and the latter pixel and component arrangement manner is called a packed format of the image (and CUs of the image).

The YUV colour format may also be subdivided into a plurality of sub-formats according to whether to perform down-sampling on a chroma component or not: a YUV4:4:4 pixel colour format under which a pixel includes a Y component, a U component and a V component; a YUV4:2:2 pixel colour format under which two left and right adjacent pixels include two Y components, a U component and a V component; and a YUV4:2:0 pixel colour format under which four left, right, upper and lower adjacent pixels arranged according to 2×2 spatial positions include four Y components, a U component and a V component. A component is usually represented by a number of 8-16 bits. The YUV4:2:2 pixel colour format and the YUV4:2:0 pixel colour format are both obtained by executing chroma component down-sampling on the YUV4:4:4 pixel colour format. A pixel component is also called a pixel sample, or is simply called a sample.

When an image is coded, an image coded merely by taking pixels in the same frame as reference pixels is called an I image, and an image coded by taking pixels of another frame as reference pixels is called a non-I image.

Along with development and popularization of a new-generation cloud computing and information processing mode and platform adopting a remote desktop as a typical representation form, interconnection among multiple computers, between a computer host and other digital equipment such as a smart television, a smart phone and a tablet personal computer and among various digital equipment has been realized and increasingly becomes a mainstream trend. Therefore, there is an urgent need for real-time screen transmission from a server (cloud) to a user at present. Since a large volume of screen video data is desired to be transmitted, effective and high-quality data compression for a computer screen image is inevitable.

Fully utilizing the characteristic of a computer screen image, an ultrahigh-efficiency compression on the computer screen image is a main aim of the latest international HEVC standard.

An outstanding characteristic of a computer screen image is that there may usually be two types of image content with different properties in one image. One type is continuous-tone content, which is usually a content shot by a camera, such as a streaming media content and a digital content, and the other type is discontinuous-tone content, which is usually a content generated by a computer, such as a menu, an icon and a text.

For the continuous-tone content, a great distortion in a reconstructed image obtained after lossy coding and decoding is still perceptually invisible or tolerant for a view if existing. While for the discontinuous-tone content, even a micro distortion in a reconstructed image obtained after lossy coding and decoding may be perceptually visible and intolerant for the viewer if existing.

In a related technology for coding and decoding an image and video, the whole image has relatively uniform image quality and distortion degree. In order to ensure high reconstruction quality and low distortion of a discontinuous-tone content, it is necessary to keep a continuous-tone content at high reconstruction quality and low distortion, so that lots of bits are consumed, which may cause a high bit rate of a video bitstream obtained by coding. For reducing the bit rate of the video bitstream of the continuous-tone content, it is needed to reduce the reconstruction quality, but the reconstruction quality of the discontinuous-tone content also greatly reduced, which is intolerant for a viewer.

Therefore, it is necessary to seek for a new coding and decoding tool capable of adaptively coding the continuous-tone content and the discontinuous-tone content according to different reconstruction qualities and distortion degrees.

That is, the continuous-tone content in the image is allowed to have a greater distortion, while the discontinuous-tone content in the same image is merely allowed to have a micro distortion.

In a currently common image compression technology, a coding process mainly includes the steps of predictive coding, matching coding, transform coding, quantization coding, post-processing of eliminating a negative coding effect (for example a block effect and a ripple effect) and the like. Dozens of coding modes and a plurality of coding parameters may usually be adopted for predictive coding. Dozens of coding modes and a plurality of coding parameters may also be adopted for matching coding. Multiple modes and a plurality of coding parameters may also be adopted for transform coding. Dozens of Quantization Parameters (QPs) may usually be adopted for quantization coding. The magnitude of the QP largely determines the quality of the image. A low-quality reconstructed image is generated by a large QP and a high-quality reconstructed image is generated by a small QP. On the other hand, a low-bit-rate video bitstream is generated by a large QP and a high-bit-rate video bitstream is generated by a small QP. Optimal coding is to give a target bit rate and a QP (the QP may also be given three components Y, U and V or R, G and B, totally 3 QPs) for each current CU and search and select a group of predictive coding mode and parameter (or matching coding mode and parameter), transform coding mode and parameter and other related coding mode and parameter from all possible predictive coding modes and parameters, matching coding modes and parameters, transform coding modes and parameters and other related coding modes and parameters, so as to make that a generated bit rate is lower than the given target bit rate and a reconstructed image has a minimum distortion. The group of coding mode and parameter is called an optimal coding mode and parameter group. In the last stage of the coding process, the selected optimal coding mode and parameter group, the given QP and residual data, which are subjected to entropy coding, are written into a video bitstream of the current CU. In order to lower the bit rate, the QP is differentially coded, that is, it is not the QP but a difference between the QP of the current CU and a QP of a previous CU written into the bitstream of the current CU. In the currently common image compression technology, there is a slight change between the QP of a CU to the QP of the next CU, and even do not change in many places. Therefore, there is no QP difference written into the current CU in many places.

In the currently common image compression technology, a decoding process of the CU is implemented by reading the selected coding mode and parameter group, the given QP and the residual data from the video bitstream by entropy decoding; calculating partially reconstructed images (also called reconstructed images) at different degrees according to these information; and performing post-processing of eliminating a negative coding effect (such as blocking artefact and ringing artifact) to finally obtain a completely stored image.

For the problem that there is yet no effective technical solution capable of adaptively coding the continuous-tone content and the discontinuous-tone content according to different reconstruction qualities and distortion degrees in a related technology, there is yet no effective solution.

SUMMARY

In order to solve the technical problem, the embodiment of the present disclosure provides a method and device for coding an image, and method and device for decoding an image.

According to an embodiment of the present disclosure, a method for coding an image is provided, comprising: Step 1): performing optimal coding on one coding block of an image (or a picture) according to a following rule: in an optimal coding process, all coding modes and parameter groups are divided into two types: a first type of coding mode and parameter group and a second type of coding mode and parameter group, a target bit rate and two Quantization Parameters (QPs), i.e. QP1 and QP2, are given, and in the process that an optimal coding mode and parameter group are searched and selected, the first type of coding mode and parameter group are used associated with QP1, and the second type of coding mode and parameter group are used associated QP2; Step 2): calculating a difference between QP1 and QP2 to obtain a QP difference, the QP difference being a constant in two continuous coding blocks or more than two continuous coding blocks; Step 3): eliminating a negative effect generated in lossy coding to generate completely reconstructed pixels; and Step 4): writing the QP difference, the selected optimal coding mode and parameter group, QP1 and residual data, which are subjected to entropy coding, into video bitstreams of a part of coding bocks in the image.

In an example embodiment, all the coding modes comprise at least one of: a predictive coding mode, a matching coding mode and a transform coding mode, and the parameter group comprises: parameters corresponding to the predictive coding mode, parameters corresponding to the matching coding mode and parameters corresponding to the transform coding mode.

In an example embodiment, after Step 1) is executed, at least one of following information is output: the selected optimal coding mode and parameter group, QP1, QP2, a residual or a matching residual.

In an example embodiment, the negative effect comprises at least one of: a blocking artifact and a ringing artifact.

In an example embodiment, all the coding modes and parameter groups are divided into two types in a following manner: for an I image, the first type of coding mode and parameter group comprises: a coding mode and parameter group adopting an intra coding mode, and the second type of coding mode and parameter group comprises: a coding mode and parameter group not adopting the intra coding mode; and for a non-I image, the first type of coding mode and parameter group comprises: a coding mode and parameter group adopting an intra or inter coding mode, and the second type of coding mode and parameter group comprises: a coding mode and parameter group not adopting both the intra and inter coding mode.

In an example embodiment, all the coding modes and parameter groups are divided into two types in a following manner: for both an I image and a non-I image, the first type of coding mode and parameter group comprises: a coding mode and parameter group adopting an intra coding mode, and the second type of coding mode and parameter group both comprises: a coding mode and parameter group not adopting the intra coding mode.

In an example embodiment, all the coding modes and parameter groups are divided into two types in a following manner: for both an I image and a non-I image, the first type of coding mode and parameter group comprises: a coding mode and parameter group adopting non-horizontal or non-vertical intra predictive coding mode, and the second type of coding mode and parameter group comprises: a coding mode and parameter group not adopting the non-horizontal or non-vertical intra predictive coding mode.

In an example embodiment, one flag bit is set in a bitstream of a coding block, and the flag bit is equal to 1 or 0, indicating that a value of the QP difference changes or does not change in a current coding block. The flag bits of two or more than two successively adjacent coding blocks shall not be equal to 1 simultaneously in bitstream.

In an example embodiment, the QP difference is a constant within a range of one Coding Tree Unit (CTU) comprising at least four coding blocks; or the QP difference is a constant within a range of several CTUs; or the QP difference is a constant within a range of one slice; or the QP difference is a constant within a range of one tile; or the QP difference is a constant within a range of one image; or the QP difference is a constant within a range of one video sequence.

In an example embodiment, one flag bit in header information of a CTU of the bitstream indicates that a value of the QP difference is kept constant in the current CTU; or one flag bit in every other several CTUs of the bitstream indicates that a value of the QP difference is kept constant in multiple subsequent CTUs; or one flag bit in header information of a slice of the bitstream indicates that a value of the QP difference is kept constant in the current slice; or one flag bit in header information of a tile of the bitstream indicates that a value of the QP difference is kept constant in the current tile; or one flag bit in header information of one image of the bitstream indicates that a value of the QP difference is kept constant in the current image; or one flag bit in header information of a sequence indicates that a value of the QP difference is kept constant in the current sequence.

In an example embodiment, a bitstream data segment where multiple coding blocks in the bitstream share one constant QP difference at least comprises sequentially arranged syntax elements which are loaded with following information: the QP difference; a coding mode and parameter group, QP1 and residual data of a first coding block; a coding mode and parameter group, QP1 and residual data of a second coding block; a coding mode and parameter group, QP1 and residual data of a nth coding block and a coding mode and parameter group, QP1 and residual data of a (n+1)th coding block, wherein n is a positive integer.

In an example embodiment, a bitstream data segment where multiple CTUs in the bitstream share one constant QP difference at least comprises sequentially arranged syntax elements which are loaded with following information: the QP difference, a coding mode and parameter group, QP1 and residual data of a first CTU, a coding mode and parameter group, QP1 and residual data of a second CTU, a coding mode and parameter group, QP1 and residual data of a nth CTU and a coding mode and parameter group, QP1 and residual data of a (n+1)th CTU, wherein n is a positive integer.

In an example embodiment, the QP difference is one non-negative integer, used for three components Y, U and V or G, B and R of the image.

In an example embodiment, the QP difference comprises three non-negative integers, used for three components Y, U and V or G, B and R of the image.

According to another embodiment of the present disclosure, a method for decoding an image is provided, comprising: Step 1): performing parsing and entropy decoding on a bitstream, and outputting following information obtained by parsing and entropy decoding: a Quantization Parameter (QP) difference, QP1 of a decoding block of a current decoding element, a coding mode and parameter group adopted by the decoding block and residual or matching residual data of the decoding block, wherein the QP difference is a constant in two or more than two continuous coding blocks; Step 2): when the coding mode and parameter group adopted by the decoding block belongs to a first type of coding mode and parameter group, setting a QP of the decoding block to be QP1, otherwise setting the QP of the decoding block to be QP2 being equal to a difference value between QP1 and the QP difference; and Step 3): implementing common decoding and reconstruction steps by using the coding mode and parameter group of the decoding block and the residual or matching residual data of the decoding block, which are generated in Step 1), and the QP of the decoding block, which is generated in Step 2).

In an example embodiment, after Step 3) is executed, further comprising: outputting reconstructed pixels, wherein the reconstructed pixels are placed in a buffer for storing a reconstructed reference pixel sample, and are used as reference pixels for subsequent decoding and reconstruction, and the reconstructed pixels comprise: completely reconstructed pixels and pixels which are partially reconstructed to different extents.

In an example embodiment, the common decoding and reconstruction steps comprise at least one of: intra prediction, inter prediction, block matching, string matching, micro-block matching, micro-block string matching, palette matching, reverse transform, reverse quantization, a compensation corresponding to a residual and a matching residual, de-blocking filtering and a sample adaptive compensation.

In an example embodiment, for an I image, the first type of coding mode and parameter group comprises: a coding mode and parameter group adopting an intra coding mode, and a second type of coding mode and parameter group comprises: a coding mode and parameter group not adopting the intra coding mode; and for a non-I image, the first type of coding mode and parameter group comprises: a coding mode and parameter group adopting an intra or inter coding mode, and the second type of coding mode and parameter group comprises: a coding mode and parameter group not adopting both the intra and inter coding mode.

In an example embodiment, for both an I image and a non-I image, the first type of coding mode and parameter group comprises: a coding mode and parameter group adopting an intra coding mode, and the second type of coding mode and parameter group both comprises: a coding mode and parameter group not adopting the intra coding mode.

In an example embodiment, for both an I image and a non-I image, the first type of coding mode and parameter group comprises: a coding mode and parameter group adopting non-horizontal or non-vertical intra predictive coding mode, and the second type of coding mode and parameter group both comprises: a coding mode and parameter group not adopting the non-horizontal or non-vertical intra predictive coding mode.

In an example embodiment, one flag bit is set in a bitstream of the decoding block, the flag bit is equal to 1 or 0, indicating that a value of the QP difference changes or does not change in the current decoding block. The flag bits of two or more than two successively adjacent coding blocks shall not be equal to 1 simultaneously in bitstream.

In an example embodiment, the QP difference is a constant within a range of one Coding Tree Unit (CTU) comprising at least four decoding blocks; or the QP difference is a constant within a range of several CTUs; or the QP difference is a constant within a range of one slice; or the QP difference is a constant within a range of one tile; or the QP difference is a constant within a range of one image; or the QP difference is a constant within a range of one video sequence.

In an example embodiment, one flag bit in header information of a CTU of the bitstream indicates that a value of the QP difference is kept constant in the current CTU; or one flag bit in every other several CTUs of the bitstream indicates that a value of the QP difference is kept constant in multiple subsequent CTUs; or one flag bit in header information of a slice of the bitstream indicates that a value of the QP difference is kept constant in the current slice; or one flag bit in header information of a tile of the bitstream indicates that a value of the QP difference is kept constant in the current tile; or one flag bit in header information of one image of the bitstream indicates that a value of the QP difference is kept constant in the current image; or one flag bit in header information of a sequence of the bitstream indicates that a value of the QP difference is kept constant in the current sequence.

In an example embodiment, a bitstream data segment where multiple decoding blocks in the bitstream share one constant QP difference at least comprises sequentially arranged syntax elements which are loaded with following information: the QP difference, and a coding mode and parameter group, QP1 and residual data of a nth decoding block, wherein the QP difference appears at intervals or continuously in the syntax elements which are sequentially arranged, and n is a positive integer.

In an example embodiment, a bitstream data segment where multiple CTUs in the bitstream share one constant QP difference at least comprises sequentially arranged syntax elements which are loaded with following information: the QP difference, and a coding mode and parameter group, QP1 and residual data of a nth CTU, wherein the QP difference appears at intervals or continuously in the syntax elements which are sequentially arranged, and n is a positive integer.

In an example embodiment, the QP difference is one non-negative integer, used for three components Y, U and V or G, B and R of the image.

In an example embodiment, the QP difference comprises three non-negative integers, used for three components Y, U and V or G, B and R of the image.

According to an embodiment of the present disclosure, a method for coding an image is provided, comprising: dividing coding mode parameters and parameter groups of one coding block into multiple types of coding mode parameters and parameter groups corresponding to the multiple types of coding mode parameters according to a specified rule respectively; determining Quantization Parameters (QPs), comprised in the multiple types of coding mode parameters according to a preset target bit rate; determining a QP of the coding block according to reconstruction quality for the coding block; selecting a coding mode parameter to be used from the multiple types of coding mode parameters according to the QP of the coding block, setting a parameter group corresponding to the selected coding mode parameter, and calculating a QP difference; and writing the coding mode parameter, the parameter group used by the coding block and the QP difference into a video bitstream.

In an example embodiment, determining the QPs comprised in the multiple types of coding mode parameters according to the preset target bit rate comprises: determining multiple picture layer and/or slice layer QPs to be used in a coding process; and determining the QPs comprised in the multiple types of coding mode parameters according to a rule as follows: each of the multiple types of coding mode parameters comprises at least one picture layer and/or slice layer QP (Note that the said slice layer can also be referred to as slice segment layer).

In an example embodiment, after determining the multiple picture layer and/or slice layer QPs, further comprising: writing the multiple determined picture layer and/or slice layer QPs into a parameter set bitstream and/or a slice-layer header information bitstream.

In an example embodiment, the method further comprising: acquiring difference values between the picture layer and/or slice layer QPs and a preset reference QP, and writing the difference value into the video bitstream.

In an example embodiment, the parameter group comprises at least one of following information: selection indication information for the multiple types of coding mode parameters, prediction mode parameters of the coding block and transform mode parameters of the coding block.

In an example embodiment, calculating the QP difference comprises: obtaining the QP difference according to difference values between the QP of the coding block and the picture layer and/or slice layer QPs comprised in the coding mode parameters indicated by parameter group information; or, obtaining the QP difference according to a difference value between the QP of the coding block and a picture layer and/or slice layer QP used by the coding block as a default.

According to another embodiment of the present disclosure, a method for decoding an image is provided, comprising: decoding a video bitstream to obtain at least one of following information: a decoding mode parameter, a parameter group and a Quantization Parameter (QP) difference, wherein the decoding mode parameter comprises: multiple types of decoding mode parameters, the parameter group comprises control information for selecting one type of decoding mode parameter from the multiple types of decoding mode parameters, and the selected decoding mode parameter is used for decoding a decoding block; determining a decoding mode parameter for decoding the decoding block from the multiple types of decoding mode parameters according to the control information of the parameter group and/or a preset corresponding relationship between parameter groups and the multiple types of decoding mode parameters; and determining a QP for decoding the decoding block according to the determined decoding mode parameter and the QP difference.

In an example embodiment, the decoding mode parameter comprise: the multiple types of decoding mode parameters, wherein each of the multiple types of decoding mode parameters comprises: picture layer and/or slice layer QPs to be used in a decoding process.

In an example embodiment, further comprising: decoding a parameter set and/or slice header information bitstream to obtain multiple picture layer and/or slice layer QPs, wherein each of the multiple types of decoding mode parameters comprises at least one picture layer and/or slice layer QP.

In an example embodiment, further comprising: decoding a block layer bitstream corresponding to the decoding block to obtain the parameter group and the QP difference; selecting, according to the parameter group, one type of decoding mode parameter from the multiple types of decoding mode parameters to decode the decoding block; and setting a QP of the decoding block to be a sum or difference value of the QP difference and the picture layer and/or slice layer QP comprised in the selected decoding mode parameter.

In an example embodiment, the parameter group comprises at least one of following information: selection indication information for the multiple types of decoding mode parameters, prediction mode parameters of the decoding block and transform mode parameters of the decoding block.

In an example embodiment, determining the picture layer and/or slice layer QPs comprises: acquiring difference values between the picture layer and/or slice layer QPs and a preset reference QP, and setting the image-layer and/or slice layer QPs to be difference values or sum values of the difference values and the preset reference QP.

According to an embodiment of the present disclosure, a device for coding an image is provided, comprising: a classification component, configured to divide coding mode parameters and parameter groups of one coding block into multiple types of coding mode parameters and parameter groups corresponding to the multiple types of coding mode parameters according to a specified rule respectively; a first determination component, configured to determine Quantization Parameters (QPs), comprised in the multiple types of coding mode parameters according to a preset target bit rate; a second determination component, configured to determine a QP of the coding block according to reconstruction quality for the coding block; a setting component, configured to select a coding mode parameter to be used from the multiple types of coding mode parameters according to the QP of the coding block, and set a parameter group corresponding to the selected coding mode parameter; a calculation component, configured to calculate a QP difference; and a writing component, configured to write the coding mode parameter, the parameter group used by the coding block and the QP difference into a video bitstream.

In an example embodiment, the first determination component comprises: a first determination element, configured to determine multiple picture layer and/or slice layer QPs to be used in a coding process; and a second determination component, configured to determine the QPs comprised in the multiple types of coding mode parameters according to a rule as follows: each of the multiple types of coding mode parameters comprises at least one picture layer and/or slice layer QP.

In an example embodiment, the writing component is further configured to write the determined multiple picture layer and/or slice layer QPs into a parameter set bitstream and/or a slice-layer header information bitstream.

In an example embodiment, the method further comprising: an acquisition component, configured to acquire difference values between the picture layer and/or slice layer QPs and a preset reference QP, wherein the writing component is further configured to write the difference values into the video bitstream.

In an example embodiment, the parameter group divided by the classification component comprises at least one of following information: selection indication information for the multiple types of coding mode parameters, prediction mode parameters of the coding block and transform mode parameters of the coding block.

In an example embodiment, the calculation component is configured to obtain the QP difference according to difference values between the QP of the coding block and the picture layer and/or slice layer QPs comprised in the coding mode parameters indicated by parameter group information; or, obtain the QP difference according to a difference value between the QP of the coding block and a picture layer and/or slice layer QP used by the coding block as a default.

According to another embodiment of the present disclosure, a device for decoding an image is provided, comprising: a decoding component, configured to decode a video bitstream to obtain at least one of following information: a decoding mode parameter, a parameter group and a Quantization Parameter (QP) difference, wherein the decoding mode parameter comprises: multiple types of decoding mode parameters, the parameter group comprises control information for selecting one type of decoding mode parameter from the multiple types of decoding mode parameters, and the selected decoding mode parameter is used for decoding a decoding block; and a determination component, configured to determine a decoding mode parameter for decoding the decoding block from the multiple types of decoding mode parameters according to the control information of the parameter group and/or a preset corresponding relationship between parameter groups and the multiple types of decoding mode parameters, and determine a QP for decoding the decoding block according to the determined decoding mode parameter and the QP difference.

In an example embodiment, the decoding mode parameter decoded by the decoding component comprise: the multiple types of decoding mode parameters, wherein each of the multiple types of decoding mode parameters comprises: picture layer and/or slice layer QPs to be used in a decoding process.

In an example embodiment, the decoding component is further configured to decode a parameter set and/or slice header information bitstream to obtain multiple picture layer and/or slice layer QPs, wherein each of the multiple types of decoding mode parameters comprises at least one picture layer and/or slice layer QP.

In an example embodiment, the decoding component is further configured to parse a block layer bitstream corresponding to the decoding block to obtain the parameter group and the QP difference; and the device further comprises: a selection component, configured to select one type of decoding mode parameter from the multiple types of decoding mode parameters to decode the decoding block according to the parameter group; and a setting component, configured to set a QP of the decoding block to be sum values or difference values of the QP difference and the picture layer and/or slice layer QP comprised in the selected decoding mode parameter In an example embodiment, the parameter group obtained by parsing by the decoding component comprises at least one of following information: selection indication information for the multiple types of decoding mode parameters, prediction mode parameters of the decoding block and transform mode parameters of the decoding block.

In an example embodiment, the determination component comprises: an acquisition element, configured to acquire a difference value between the picture layer and/or slice layer QPs and a preset reference QP; and a setting element, configured to set the image-layer and/or slice layer QPs to be difference value or sum value of the difference values and the preset reference QP.

Through the embodiment of the present disclosure, a technical means of dividing all the coding modes and the parameter groups into two types: the first type of coding modes and parameters and the second type of coding mode and parameter group, and selecting a proper coding mode from the two types of coding modes and parameter groups according to reconstruction quality for the coding block to further code the image during optimal coding of the coding block is adopted, so that the problem that there is yet no effective technical solution capable of adaptively coding a continuous-tone content and a discontinuous-tone content according to different reconstruction qualities and distortion degrees in the related technology is solved, and an optimal coding mode may further be adaptively selected to code the current coding block according to the target bit rate for the current coding block.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

Other characteristics and advantages of the present disclosure will be elaborated in the subsequent specification, and moreover, partially become obvious from the specification, or is understood by implementation of the present disclosure. A purpose and other advantages of the present disclosure may be achieved and obtained by structures specifically indicated in the provided specification, claims and drawings.

In order to make those skilled in the art understand the solutions of the present disclosure better, the technical solutions in the embodiments of the present disclosure will be clearly and completely described below with reference to the drawings in the embodiments of the present disclosure, and obviously, the described embodiments are not all embodiments but only a part of embodiments of the present disclosure. All other embodiments implemented by those skilled in the art based on the embodiments of the present disclosure without any creative work shall fall within the scope of protection of the present disclosure.

Figure 1:
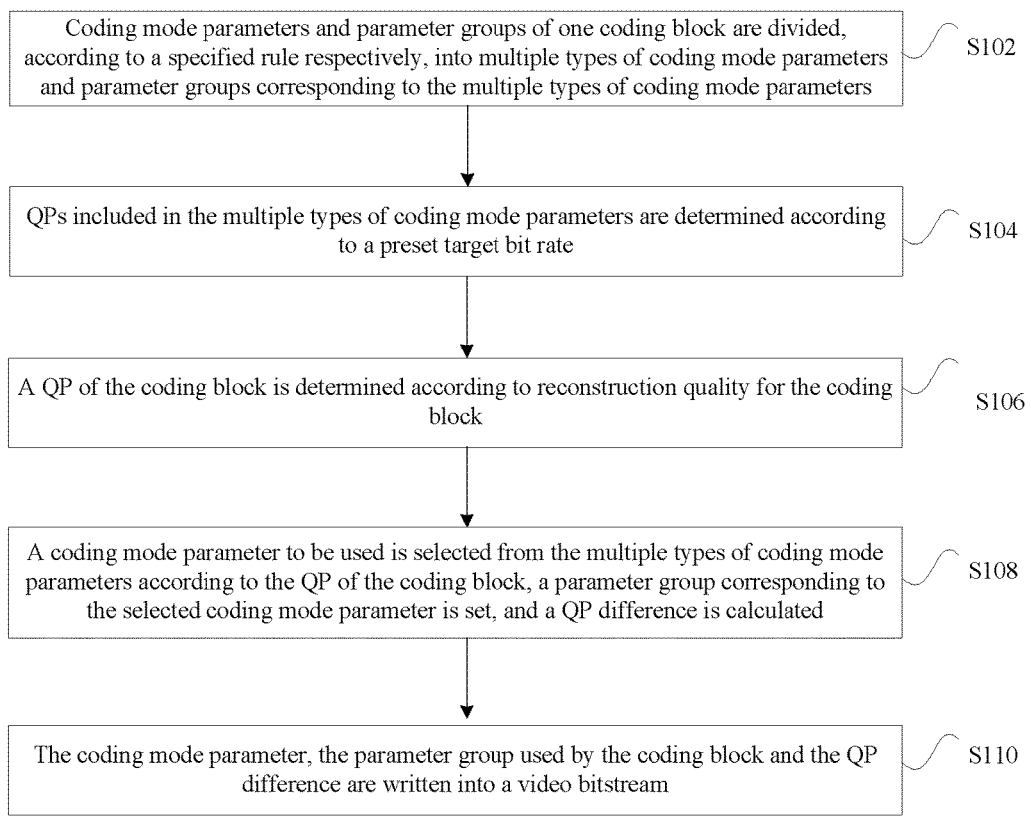
FIG. 1 is a flowchart of a method for coding an image according to an embodiment of the present disclosure.

The embodiment provides a method for coding an image, FIG. 1 is a flowchart of a method for coding an image according to an embodiment of the present disclosure, and as shown in FIG. 1, the flow includes the following steps:

Step 102: coding mode parameters and parameter groups of one coding block are divided into multiple types of coding mode parameters and parameter groups corresponding to the multiple types of coding mode parameters according to a specified rule respectively;

Step 104: QPs included in the multiple types of coding mode parameters are determined according to a preset target bit rate;

Step 106: a QP of the coding block is determined according to reconstruction quality for the coding block;

Step 108: a coding mode parameter to be used is selected from the multiple types of coding mode parameters according to the QP of the coding block, a parameter group corresponding to the selected coding mode parameter is set, and a QP difference is calculated; and Step 110: the coding mode parameter, the parameter group used by the coding block and the QP difference are written into a video bitstream.

By each of the abovementioned steps, all the coding modes and the parameter groups are divided into two types: a first type of coding mode and parameter and a second type of coding mode and parameter group, and a proper coding mode is selected from the two types of coding modes and parameter groups according to reconstruction quality for the coding block, so as to further code an image during performing optimal coding on the coding block, so that the problem that there is yet no effective technical solution capable of adaptively coding the continuous-tone content and the discontinuous-tone content according to different reconstruction qualities and distortion degrees in the related technology is solved, and an optimal coding mode may further be adaptively selected to code the current coding block according to the target bit rate for the current coding block.

Multiple implementation manners may be adopted for Step 106, and in the embodiment of the present disclosure, Step 106 may be implemented in a manner as follows: multiple picture layer and/or slice layer QPs to be used in a coding process are determined; and the QPs included in the multiple types of coding mode parameters are determined according to a rule as follows: each of the multiple types of coding mode parameters includes at least one picture layer and/or slice layer QP.

Optionally, after the technical solution is executed, that is, after the multiple picture layer and/or slice layer QPs are determined, the following technical solution may further be executed: the multiple determined picture layer and/or slice layer QPs are written into a parameter set bitstream and/or a slice-layer header information bitstream.

Wherein, the method may further include that: difference values between the picture layer and/or slice layer QPs and a preset reference QP are acquired, and the difference values are written into the video bitstream. The parameter group includes at least one of the following information: selection indication information for the multiple types of coding mode parameters, prediction mode parameters of the coding block and transform mode parameters of the coding block.

Step 108 may be implemented by, but not limited to, the following two technical solutions: the QP difference is obtained according to difference values between the QP of the coding block and the picture layer and/or slice layer QPs included in the coding mode parameters indicated by parameter group information; or, the QP difference is obtained according to a difference value between the QP of the coding block and a picture layer and/or slice layer QP used by the coding block as a default.

In the embodiment of the present disclosure, all the coding modes include at least one of: a predictive coding mode, a matching coding mode and a transform coding mode, the parameter group includes: parameters corresponding to the predictive coding mode, parameters corresponding to the matching coding mode and parameters corresponding to the transform coding mode, and after Step 1) is executed, at least one of the following information is output: the selected optimal coding mode and parameter group, QP1, QP2, a residual or a matching residual; and a negative effect includes at least one of: a block effect and a ripple effect.

It is important to note that there may be multiple conditions of dividing the coding modes and the parameter groups into two types, and they will be introduced below respectively.

First Condition

For an I image, the first type of coding mode and parameter group includes: a coding mode and parameter group adopting an intra coding mode, and the second type of coding mode and parameter group includes: a coding mode and parameter group not adopting the intra coding mode; and for a non-I image, the first type of coding mode and parameter group includes: a coding mode and parameter group adopting an intra or inter coding mode, and the second type of coding mode and parameter group includes: a coding mode and parameter group not adopting both the intra and inter coding mode.

Second Condition

For an I image and a non-I image, the first type of coding mode and parameter group both includes: a coding mode and parameter group adopting an intra coding mode, and the second type of coding mode and parameter group both includes: a coding mode and parameter group not adopting the intra coding mode.

Third Condition

For an I image and a non-I image, the first type of coding mode and parameter group both includes: a coding mode and parameter group adopting non-horizontal or non-vertical intra predictive coding mode, and the second type of coding mode and parameter group both includes: a coding mode and parameter group not adopting the non-horizontal or non-vertical intra predictive coding mode.

In the embodiment of the present disclosure, the technical solution is further improved in a manner as follows: a flag bit is set in the bitstream of the coding block, and the flag bit is equal to 1 or 0, indicating that a value of the QP difference changes or does not change in the current coding block. The flag bits of two or more than two successively adjacent coding blocks shall not be equal to 1 simultaneously in bitstream.

Furthermore, the QP difference is a constant within a range of a CTU including at least four coding blocks; or the QP difference is a constant within a range of several CTUs; or the QP difference is a constant within a range of one slice; or the QP difference is a constant within a range of one tile; or the QP difference is a constant within a range of one image; or the QP difference is a constant within a range of one video sequence.

Optionally, a flag bit in header information of a CTU of the bitstream may indicate that a value of the QP difference is kept constant in the current CTU; or one flag bit in every other several CTUs of the bitstream indicates that a value of the QP difference is kept constant in multiple subsequent CTUs; or one flag bit in header information of a slice of the bitstream indicates that a value of the QP difference is kept constant in the current slice; or one flag bit in header information of a tile of the bitstream indicates that a value of the QP difference is kept constant in the current tile; or one flag bit in header information of one image of the bitstream indicates that a value of the QP difference is kept constant in the current image; or one flag bit in header information of a sequence indicates that a value of the QP difference is kept constant in the current sequence.

Wherein, a bitstream data segment where multiple coding blocks in the bitstream share one constant QP difference at least includes syntax elements which are loaded with the following information and sequentially arranged: the QP difference, and a coding mode and parameter group, QP1 and residual data of a nth coding block, wherein the QP difference appears at intervals or continuously in the syntax elements which are sequentially arranged, and n is a positive integer.

That is, the following information forms the syntax elements which are sequentially arranged: the QP difference, a coding mode and parameter group, QP1 and residual data of a first coding block; a coding mode and parameter group, QP1 and residual data of a second coding block; to a coding mode and parameter group, QP1 and residual data of a nth coding block and a coding mode and parameter group, QP1 and residual data of a (n+1)th coding block, wherein n is a positive integer, and in an example of the embodiment of the present disclosure, the QP difference may appear in multiple continuous coding blocks or at intervals in multiple coding blocks, which will not be limited in the embodiment of the present disclosure.

Furthermore, a bitstream data segment where multiple CTUs in the bitstream share one constant QP difference may at least include syntax elements which are loaded with the following information and sequentially arranged: the QP difference, and a coding mode and parameter group, QP1 and residual data of a nth CTU, wherein the QP difference appears at intervals or continuously in the syntax elements which are sequentially arranged, and n is a positive integer.

That is, the following information forms the syntax elements which are sequentially arranged: the QP difference, a coding mode and parameter group, QP1 and residual data of a first CTU, a coding mode and parameter group, QP1 and residual data of a second CTU, to a coding mode and parameter group, QP1 and residual data of a nth CTU and a coding mode and parameter group, QP1 and residual data of a (n+1)th CTU, wherein n is a positive integer, and in an example of the embodiment of the present disclosure, the QP difference may appear in multiple continuous coding blocks or at intervals in multiple CTUs, which will not be limited in the embodiment of the present disclosure.

In the embodiment of the present disclosure, the QP difference is one non-negative integer, used for three components Y, U and V or G, B and R of the image; and the QP difference includes non-negative integers, used for three components Y, U and V or G, B and R of the image.

The abovementioned image coding process may be summarized to include: Step 1): optimal coding is performed on one coding block of an image (or a picture) according to the following rule: in an optimal coding process, all coding modes and parameter groups are divided into two types: a first type of coding mode and parameter group and a second type of coding mode and parameter group, a target bit rate and two QPs, i.e. QP1 and QP2, are given, and in the process that an optimal coding mode and parameter group is searched and selected, the first type of coding mode and parameter group are used associated with QP1, and the second type of coding mode and parameter group are used associated with QP2; Step 2): a difference between QP1 and QP2 is calculated to obtain a QP difference, the QP difference being a constant in two continuous coding blocks or more than two continuous coding blocks; Step 3): a negative effect generated in lossy coding is eliminated to generate completely reconstructed pixels; and Step 4): the QP difference, the selected optimal coding mode and parameter group, QP1 and residual data, which are subjected to entropy coding, are written into video bitstreams of a part of coding blocks in the image.

Figure 2:
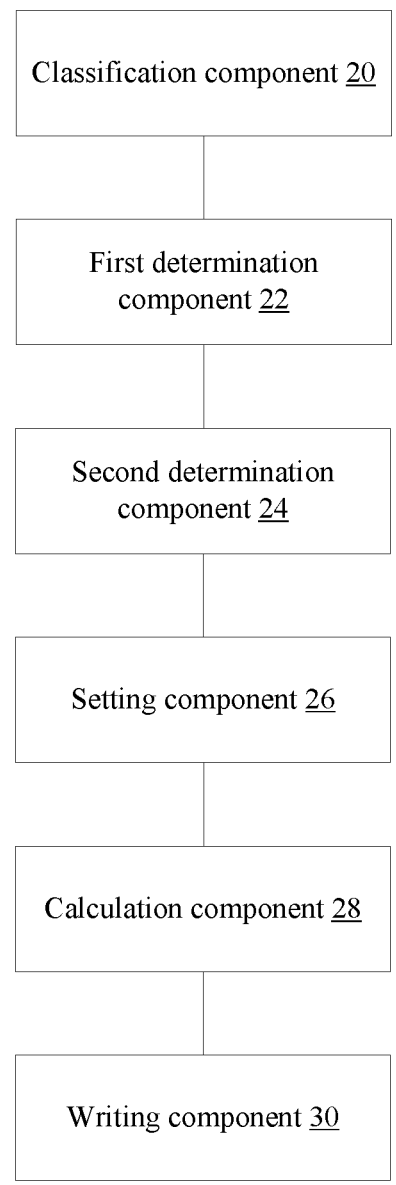
FIG. 2 is a structure block diagram of a device for coding an image according to an embodiment of the present disclosure.

The embodiment further provides a device for coding an image, which is configured to implement the abovementioned embodiment and example implementation mode, what has been described will not be elaborated, and components involved in the device will be described below. For example, term "component", used below, is a combination of software and/or hardware capable of realizing a preset function. The device described in the following embodiment is preferably implemented by software, but implementation of the device with hardware or the combination of software and hardware is also possible and conceivable. FIG. 2 is a structure block diagram of a device for coding an image according to an embodiment of the present disclosure. As shown in FIG. 2, the device includes:

a classification component 20, configured to divide coding mode parameters and parameter groups of one coding block into multiple types of coding mode parameters and parameter groups corresponding to the multiple types of coding mode parameters according to a specified rule respectively;

a first determination component 22, connected with the classification component 20 and configured to determine QPs included in the multiple types of coding mode parameters according to a preset target bit rate;

a second determination component 24, connected with the first determination component 22 and configured to determine a QP of the coding block according to reconstruction quality for the coding block;

a setting component 26, connected with the second determination component 24 and configured to select a coding mode parameter to be used from the multiple types of coding mode parameters according to the QP of the coding block, and set a parameter group corresponding to the selected coding mode parameter;

a calculation component 28, connected with the setting component 26 and configured to calculate a QP difference; and a writing component 30, connected with the calculation component 28 and configured to write the coding mode parameter, the parameter group used by the coding block and the QP difference into a video bitstream.

Under comprehensive effects of all the abovementioned components, all the coding modes and the parameter groups are divided into two types: a first type of coding mode and parameter group and a second type of coding mode and parameter group, and a proper coding mode is selected from the two types of coding modes and parameter groups according to reconstruction quality for the coding block, so as to further code an image during optimal coding of the coding block, so that the problem that there is yet no effective technical solution capable of adaptively coding the continuous-tone content and the discontinuous-tone content according to different reconstruction qualities and distortion degrees in the related art is solved, and an optimal coding mode may further be adaptively selected to code the current coding block according to the target bit rate for the current coding block.

Optionally, the first determination component 22 may include the following elements: a first determination element 220, configured to determine multiple picture layer and/or slice layer QPs to be used in a coding process; and a second determination component 222, connected with the first determination element 220 and configured to determine the QPs included in the multiple types of coding mode parameters according to a rule as follows: each of the multiple types of coding mode parameters all includes at least one picture layer and/or slice layer QP.

Wherein, the writing component 30 is further configured to write the determined multiple picture layer and/or slice layer QPs into a parameter set bitstream and/or a slice-layer header information bitstream.

Figure 3:
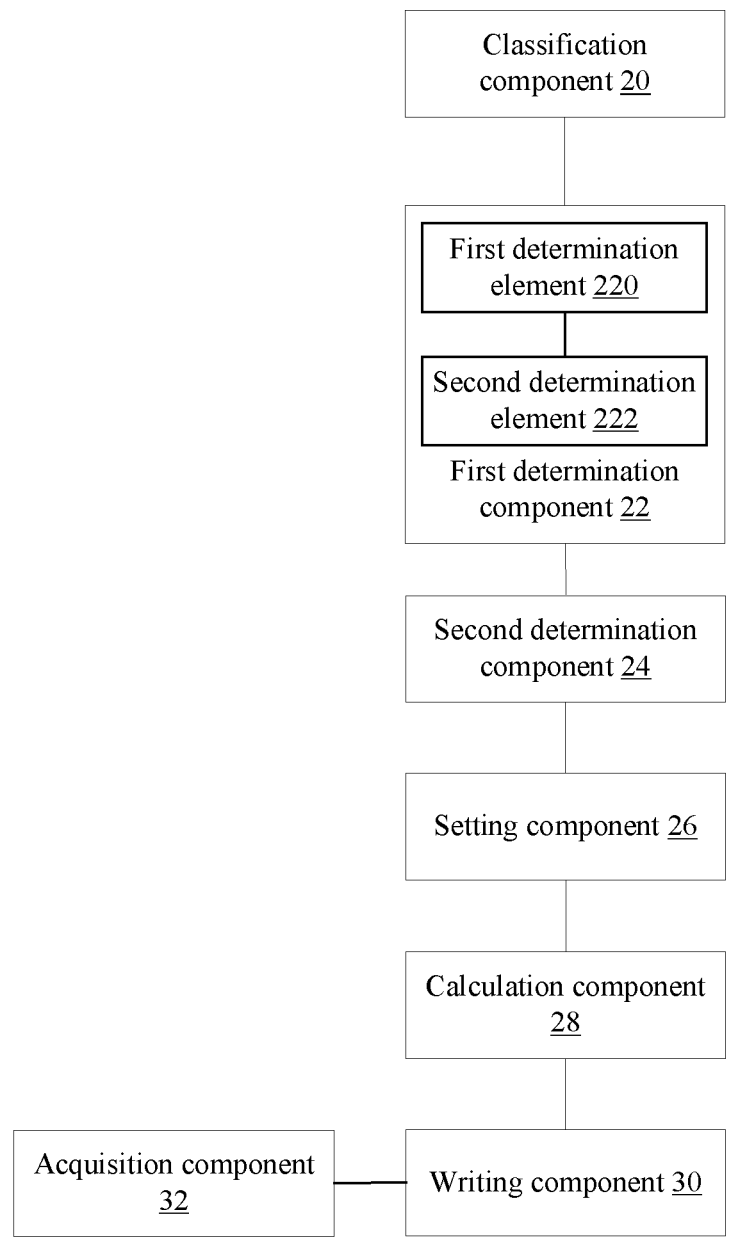
FIG. 3 is another structure block diagram of a device for coding an image according to an embodiment of the present disclosure.

In the embodiment of the present disclosure, the technical solution is further improved in a manner as follows: as shown in FIG. 3, the device further includes: an acquisition component 32, configured to acquire difference values between the picture layer and/or slice layer QPs and a preset reference QP; and the writing component 30 is further configured to write the difference values into the video bitstream.

Optionally, the parameter group divided by the classification component 20 includes at least one of the following information: selection indication information for the multiple types of coding mode parameters, prediction mode parameters of the coding block and transform mode parameters of the coding block.

Optionally, the calculation component 28 is configured to obtain the QP difference according to difference values between the QP of the coding block and the picture layer and/or slice layer QPs included in the coding mode parameters indicated by parameter group information; or, obtain the QP difference according to a difference value between the QP of the coding block and a picture layer and/or slice layer QP used by the coding block as a default.

Figure 4:
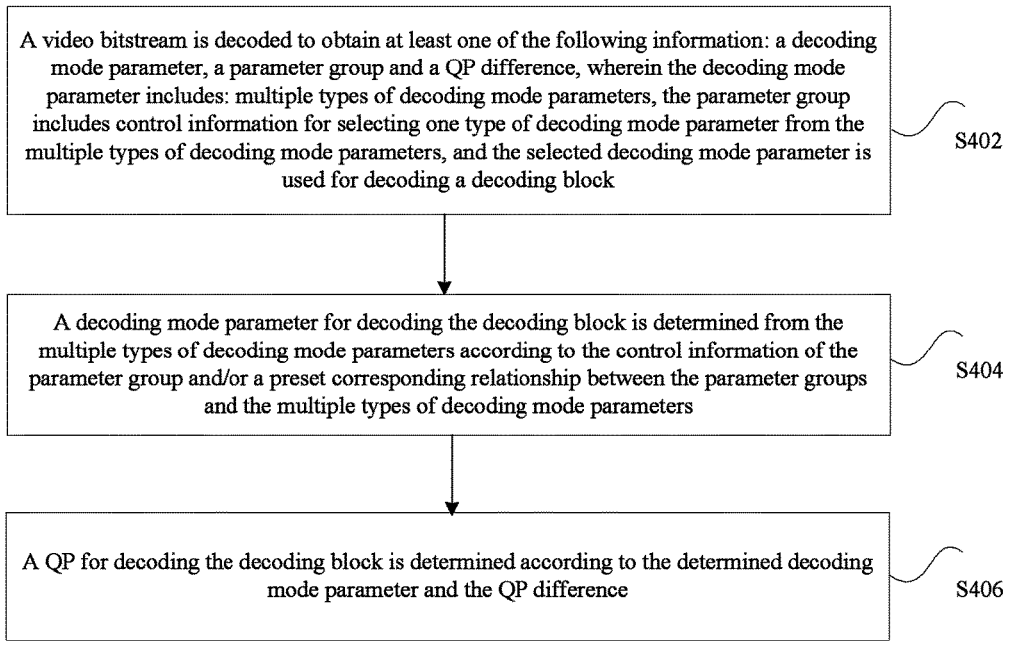
FIG. 4 is a flowchart of a method for decoding an image according to an embodiment of the present disclosure.

In order to complete the technical solution provided by the embodiment of the present disclosure, the embodiment of the present disclosure further provides a method for decoding an image, FIG. 4 is a flowchart of a method for decoding an image according to an embodiment of the present disclosure, and as shown in FIG. 4, the method includes the following steps:

Step 402: a video bitstream is decoded to obtain at least one of the following information: a decoding mode parameter, a parameter group and a QP difference, wherein the decoding mode parameter includes: multiple types of decoding mode parameters, the parameter group includes control information for selecting one type of decoding mode parameter from the multiple types of decoding mode parameters, and the selected decoding mode parameter is used for decoding a decoding block;

Step 404: a decoding mode parameter for decoding the decoding block is determined from the multiple types of decoding mode parameters according to the control information of the parameter group and/or a preset corresponding relationship between the parameter groups and the multiple types of decoding mode parameters; and Step 406: a QP for decoding the decoding block is determined according to the determined decoding mode parameter and the QP difference.

By the abovementioned steps, all the coding modes and the parameter groups are divided into two types: a first type of coding mode and parameter group and a second type of coding mode and parameter group, and the QP for decoding the decoding block is further determined according to the decoding mode parameter and the QP difference, so that the problem that there is yet no effective technical solution capable of adaptively decoding the continuous-tone content and the discontinuous-tone content in the related art is solved, and an optimal coding mode may further be adaptively selected to code a current coding block according to a target bit rate for the current coding block.

Wherein, the decoding mode parameter includes: the multiple types of decoding mode parameters, wherein each of the multiple types of decoding mode parameters all includes: picture layer and/or slice layer QPs to be used in a decoding process.

Optionally, the method further includes that: a parameter set and/or slice header information bitstream is decoded to obtain multiple picture layer and/or slice layer QPs, wherein each of the multiple types of decoding mode parameters all includes at least one picture layer and/or slice layer QP. The method further includes that: a block layer bitstream corresponding to the decoding block is decoded to obtain the parameter group and the QP difference; one type of decoding mode parameter is selected from the multiple types of decoding mode parameters to decode the decoding block according to the parameter group; and a QP of the decoding block is set to be a sum or difference value of the picture layer and/or slice layer QP included in the selected decoding mode parameter and the QP difference.

It is important to note that the parameter group includes at least one of the following information: selection indication information for the multiple types of decoding mode parameters, prediction mode parameters of the decoding block and transform mode parameters of the decoding block.

In the embodiment of the present disclosure, the step that the picture layer and/or slice layer QPs may be determined in a manner as follows: difference values between the picture layer and/or slice layer QPs and a preset reference QP are acquired, and the image-layer and/or slice layer QPs are set to be difference values or sum values of the difference values and the reference QP.

From the above, the image decoding method provided by the embodiment of the present disclosure may substantially be summarized to include: Step 1) a bitstream is parsed and entropy decoded, and the following information obtained by parsing and entropy decoding is output: a QP difference, QP1 of a decoding block of a current decoding element, a coding mode and parameter group adopted by the decoding block and residual or matching residual data of the decoding block, wherein the QP difference may be a constant in two or more than two continuous coding blocks; Step 2): when the coding mode and parameter group adopted by the decoding block belongs to a first type of coding mode and parameter group, a QP of the decoding block is set to be QP1, otherwise the QP of the decoding block is set to be QP2 being equal to a difference value between QP1 and the QP difference; and Step 3): common decoding and reconstruction steps are implemented by using the coding mode and parameter group of the decoding block and the residual or matching residual data of the decoding block, which are generated in Step 1), and the QP of the decoding block, which is generated in Step 2). After Step 3) is executed, the method further includes that: reconstructed pixels are output, wherein the reconstructed pixels are placed in a buffer for storing a reconstructed reference pixel sample, and may be used as reference pixels for subsequent decoding and reconstruction, and the reconstructed pixels include: completely reconstructed pixels and pixels which are partially reconstructed to different extents.

It is important to note that the common decoding and reconstruction steps in the embodiment of the present disclosure include at least one of: intra prediction, inter prediction, block matching, string matching, micro-block matching, micro-block string matching, palette matching, reverse transform, reverse quantization, a compensation corresponding to a residual and a matching residual, de-blocking filtering and a sample adaptive compensation.

Figure 5:
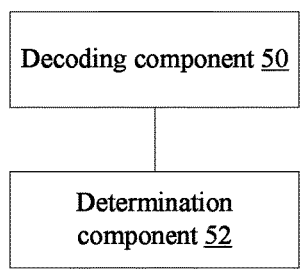
FIG. 5 is a structure block diagram of a device for decoding an image according to an embodiment of the present disclosure.

The embodiment further provides a device for coding an image, which is configured to implement the abovementioned embodiment and example implementation mode, what has been described will not be elaborated, and components involved in the device will be described below. For example, term "component", used below, is a combination of software and/or hardware capable of realizing a preset function. The device described in the following embodiment is preferably implemented by software, but implementation of the device with hardware or the combination of software and hardware is also possible and conceivable. FIG. 5 is a structure block diagram of a device for decoding an image according to an embodiment of the present disclosure. As shown in FIG. 5, the device includes:

a decoding component 50, configured to decode a video bitstream to obtain at least one of the following information: a decoding mode parameter, a parameter group and a QP difference, wherein the decoding mode parameter includes: multiple types of decoding mode parameters, the parameter group includes control information for selecting one type of decoding mode parameter from the multiple types of decoding mode parameters, and the selected decoding mode parameter is used for decoding a decoding block; and a determination component 52, connected with the decoding component 50 and configured to determine a decoding mode parameter for decoding the decoding block from the multiple types of decoding mode parameters according to the control information of the parameter group and/or a preset corresponding relationship between parameter groups and the multiple types of decoding mode parameters, and determine a QP for decoding the decoding block according to the determined decoding mode parameter and the QP difference.

Under comprehensive effects of all the abovementioned components, all the coding modes and the parameter groups are divided into two types: a first type of coding mode and parameter group and a second type of coding mode and parameter group, and the QP for decoding the decoding block is further determined according to the decoding mode parameter and the QP difference, so that the problem that there is yet no effective technical solution capable of adaptively decoding the continuous-tone content and the discontinuous-tone content in the related art is solved, and an optimal coding mode may further be adaptively selected to code a current coding block according to a target bit rate for the current coding block.

Wherein, the decoding mode parameter decoded by the decoding component 50 includes: the multiple types of decoding mode parameters, wherein each of the multiple types of decoding mode parameters includes: picture layer and/or slice layer QPs to be used in a decoding process; and the parameter group obtained by parsing by the decoding component 50 includes at least one of the following information: selection indication information for the multiple types of decoding mode parameters, prediction mode parameters of the decoding block and transform mode parameters of the decoding block.

Furthermore, the decoding component 50 is further configured to decode a parameter set and/or slice header information bitstream to obtain multiple picture layer and/or slice layer QPs, wherein each of the multiple types of decoding mode parameters includes at least one picture layer and/or slice layer QP.

Figure 6:
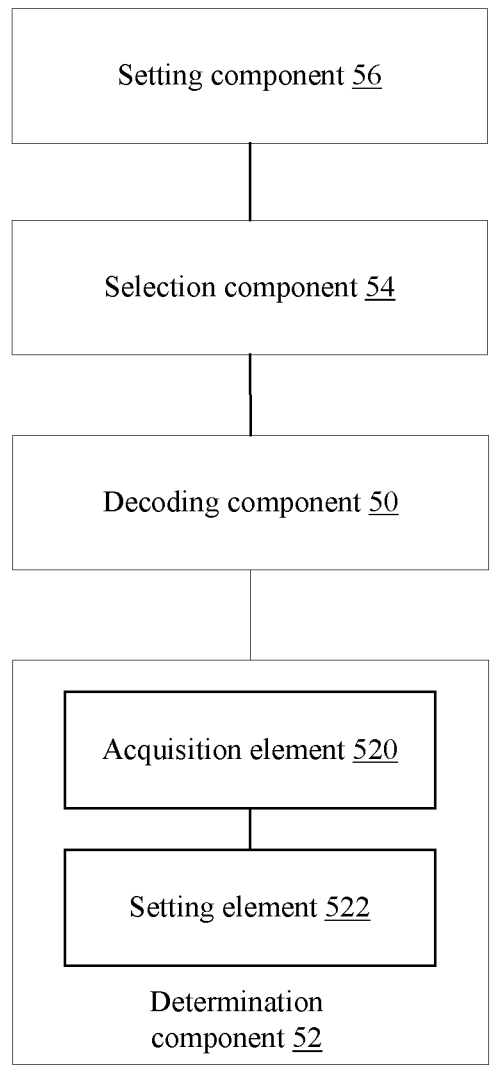
FIG. 6 is another structure block diagram of a device for decoding an image according to an embodiment of the present disclosure.

Of course, it is important to note that the decoding component 50 is further configured to parse a block layer bitstream corresponding to the decoding block to obtain the parameter group and the QP difference; and as shown in FIG. 6, the device further includes: a selection component 54, connected with the decoding component 50 and configured to select one type of decoding mode parameter from the multiple types of decoding mode parameters to decode the decoding block according to the parameter group; and a setting component 56, connected with the selection component 54 and configured to set a QP of the decoding block to be sum values or difference values of the picture layer and/or slice layer QP included in the selected decoding mode parameter and the QP difference.

In the embodiment of the present disclosure, the determination component 52 includes: an acquisition element 520, configured to acquire difference values between the picture layer and/or slice layer QPs and a preset reference QP; and a setting element 522, connected with the acquisition component 520 and configured to set the image-layer and/or slice layer QPs to be difference values or sum values of the difference values and the reference QP.

In order to make a control flow of terminal equipment better understood, descriptions will be given below with reference to FIGS. 7-8 and an example embodiment and are not intended to limit the embodiments of the present disclosure.

A main idea of a coding manner provided by the example embodiment of the present disclosure is that: in the process of optimal coding current CU, all coding modes and parameter groups (including a predictive coding mode and parameter, a matching coding mode and parameter, a transform coding mode and parameter and other related coding modes and parameters) are divided into two types, called a first type of coding mode and parameter group and a second type of coding mode and parameter group, and a target bit rate and two QPs, called QP1 and QP2, are given at the same time. In the process that an optimal coding mode and parameter group are searched and selected, the first type of coding mode and parameter group are used associated with QP1. The second type of coding mode and parameter group are used associated with QP2. A difference between QP1 and QP2 is called a QP1-2 difference, is a non-negative integer (or three non-negative integers corresponding to three components Y, U and V or R, G and B). The difference is substantially kept constant without changing in two or more continuous adjacent CUs, that is, the QP1-2 difference is a constant within a range of at least two adjacent CUs, and is usually a constant within a range of one CTU or multiple CTUs or a slice or a tile or an image or even a video sequence. When video bitstreams are generated in a coding process, the QP1-2 difference is written into the video bitstreams after entropy coding at first, and then the selected optimal coding mode and parameter group of multiple CUs, given QP1 (=QP2+QP1-2 difference) and residual data, which are subjected to entropy coding, are sequentially written into the video bitstreams. The QP1-2 difference is not needed to be written into the video bitstreams of each CU. Merely when the QP1-2 difference changes, it is needed to write a new QP1-2 difference into the corresponding video bitstream. In order to reduce a bit rate, QP1 is differentially coded, that is, it is not QP1 but a difference between QP1 of a current coding block and QP1 of a previous CU written into the bitstream of the current CU. Slight change may take place between QPs from a CU to the next CU, and even does not exist in many places. Therefore, there is no QP1 difference written into the current CU in many cases.

A main idea of a decoding method provided by the example embodiment is that: in a decoding process, it is needed to read a QP1-2 difference after entropy decoding. When a current CU is decoded, information such as a coding mode and parameter group selected for the current CU, given QP1 and residual data is read from a video bitstream by entropy decoding. When the read coding mode and parameter group belongs to a first type of coding mode and parameter group, a QP of the current CU is set to be QP1, otherwise the QP of the current CU is set to be QP2=QP1− QP1-2 difference. Images reconstructed to different extents (also called reconstructed images) are calculated by each decoding step according to the information such as the read coding mode and parameter group, the set QP and the read residual data. Then, post-processing of eliminating a negative coding effect (such as blocking artifact and ringing artifact) is performed to finally obtain a completely reconstructed image.

Figure 7:
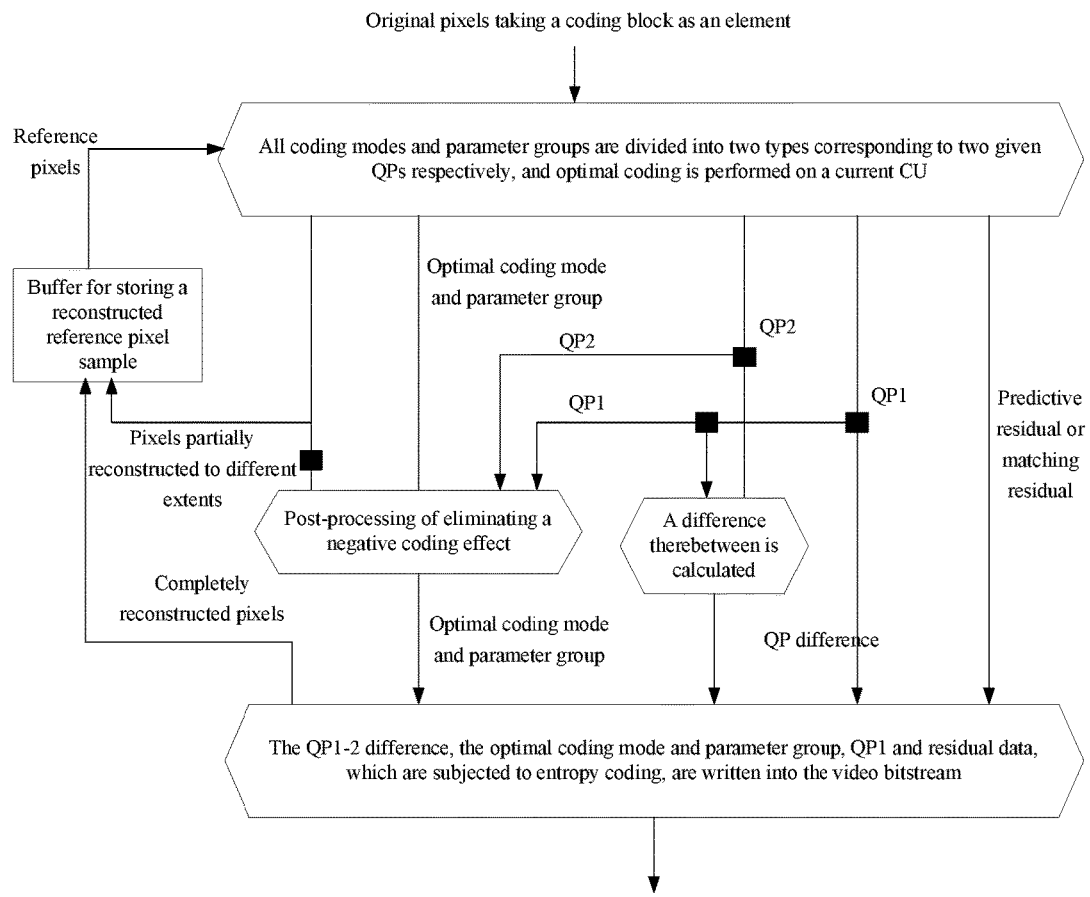
FIG. 7 is a flowchart of a coding method according to an example embodiment of the present disclosure.

FIG. 7 is a flowchart of a coding method according to an example embodiment of the present disclosure, and as shown in FIG. 7, the coding method of the preferred embodiment includes the following steps:

optimal coding is performed on a current CU, wherein, in an optimal coding process, all coding modes and parameter groups (including a predictive coding mode and parameter, a matching coding mode and parameter, a transform coding mode and parameter and other related coding modes and parameters) are divided into two types, called a first type of coding mode and parameter group and a second type of coding mode and parameter group, and a target bit rate and two QPs, called QP1 and QP2, are given at the same time; in the process that an optimal coding mode and parameter group are searched and selected, the first type of coding mode and parameter group are used associated with QP1, and the second type of coding mode and parameter group are used associated with QP2; output of the step is the selected optimal coding mode and parameter group, QP1, QP2, a residual or a matching residual and pixels partially reconstructed to different extents;

a difference between QP1 and QP2 is calculated as: QP1-2 difference=QP1−QP2, wherein the QP1-2 difference is substantially kept constant without changing in two or more continuous CUs, and is a constant in a range of at least two adjacent CUs post-processing of eliminating a negative effect, such as blocking artifact and ringing artifact, generated in lossy coding is performed to generate completely reconstructed pixels, wherein the completely reconstructed pixels and the pixels partially reconstructed to different extents in Step 1) are placed in a buffer for storing a reconstructed reference pixel sample, and are used as reference pixels for subsequent CU coding; and the QP1-2 difference, the selected optimal coding mode and parameter group, QP1 and residual data, which are subjected to entropy coding, are written into video bitstreams, wherein changes in the QP1-2 difference are not allowed to appear in the bitstreams of each CU at the same time.

Figure 8:
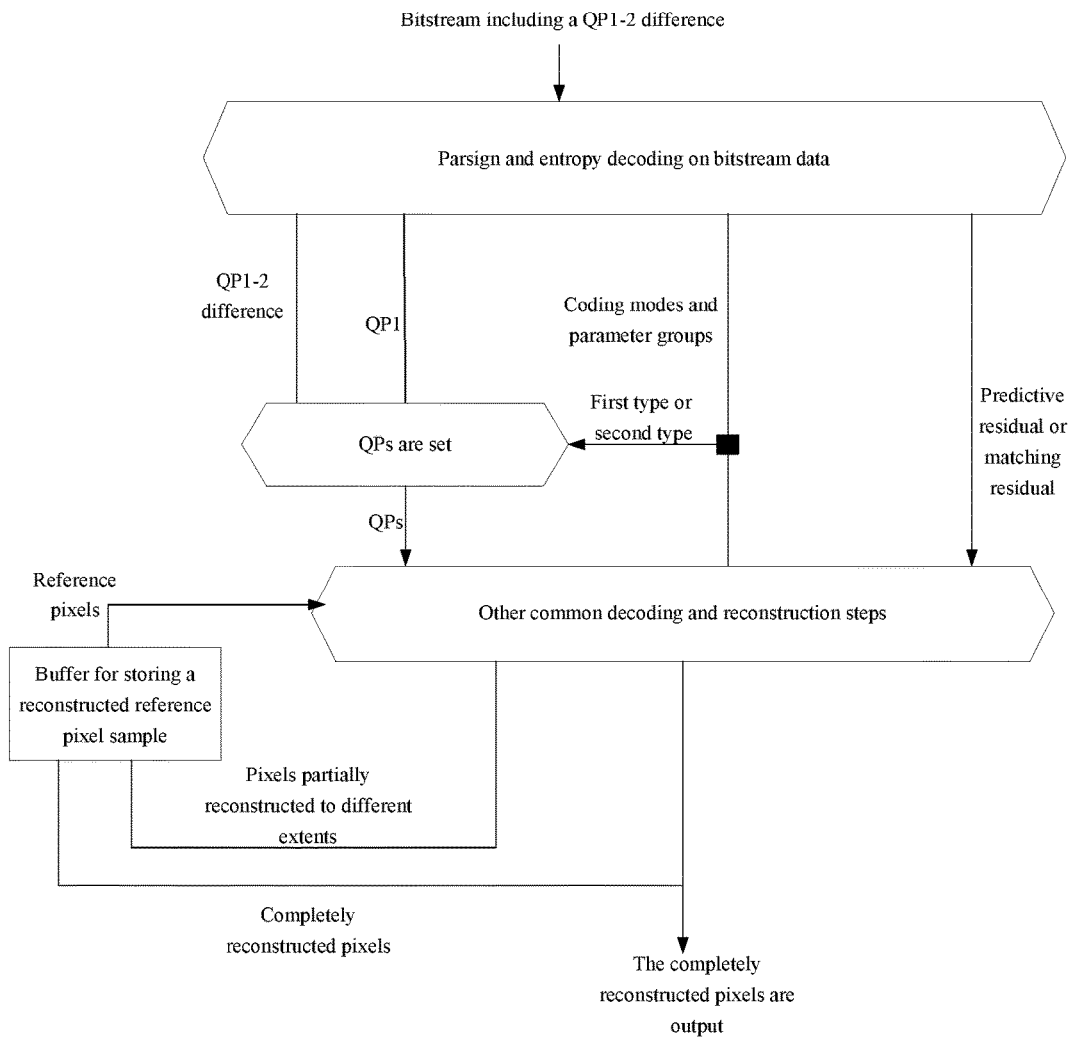
FIG. 8 is a flowchart of a decoding method according to an example embodiment of the present disclosure.

FIG. 8 is a flowchart of a decoding method according to an example embodiment of the present disclosure, and as shown in FIG. 8, the decoding method of the example embodiment includes the following steps:

A bitstream including a QP1-2 difference and other coding results is parsed and entropy decoded, and 1) the QP1-2 difference obtained by parsing and entropy decoding, 2) QP1, obtained by parsing and entropy decoding, of a currently decoded CU, 3) a coding mode and parameter group, obtained by parsing and entropy decoding, of the currently decoded CU and 4) residual or matching residual data, obtained by parsing and entropy decoding, of the currently decoded CU are output, wherein the change of the QP1-2 difference is not allowed to appear in bitstreams of two or more continuous adjacent CUs, and QP1 may change in the bitstreams of each CU, and may also be kept unchanged in the bitstream of all CU;

when the coding mode and parameter group of the currently decoded CU belongs to a first type of coding mode and parameter group, a QP of the currently decoded CU is set to be QP1, otherwise the QP of the currently decoded CU is set to be QP2=QP1−QP1-2 difference; and other common decoding and reconstruction steps, such as intra prediction, inter prediction, block matching, string matching, micro-block matching, micro-block string matching, palette matching, reverse transform, reverse quantization, a compensation corresponding to a residual and a matching residual (i.e. reverse operation of residual calculation operation), de-blocking filtering and a sample adaptive compensation, are implemented by using the coding mode and parameter group of the currently decoded CU and the residual or matching residual data of the currently decoded CU, which are generated in Step 1), and the QP of the currently decoded CU, which is generated in Step 2), wherein output of the step includes reconstructed pixels (including completely reconstructed pixels and pixels partially reconstructed to different extents), the reconstructed pixels are placed in a buffer for storing a reconstructed reference pixel sample, and are used as reference pixels for subsequent decoding and reconstruction steps, and the completely reconstructed pixels are also final output of the decoding method.

Embodiment 1 of the First Type of Coding Mode and Parameter Group and the Second Type of Coding Mode and Parameter Group For an I image, the first type of coding mode and parameter group refers to a coding mode and parameter group all adopting an intra coding mode, and the second type of coding mode and parameter group refers to a coding mode and parameter group all not adopting the intra coding mode. For a non-I image, the first type of coding mode and parameter group refers to a coding mode and parameter group all adopting an intra or inter coding mode, and the second type of coding mode and parameter group refers to a coding mode and parameter group all not adopting both the intra and inter coding mode.

The coding mode and parameter group not adopting the intra coding mode include, but not limited to, coding modes and parameter groups adopting various intra matching coding modes.

The coding mode and parameter group not adopting the intra coding mode include, but not limited to, coding modes and parameter groups adopting various intra block matching coding modes.

The coding mode and parameter group not adopting the intra coding mode include, but not limited to, coding modes and parameter groups adopting various intra string matching coding modes.

The coding mode and parameter group not adopting both the intra and inter coding mode include, but not limited to, coding modes and parameter groups adopting various intra matching coding modes.

The coding mode and parameter group not adopting both the intra and inter coding mode include, but not limited to, coding modes and parameter groups adopting various intra block matching coding modes.

The coding mode and parameter group not adopting both the intra and inter coding mode include, but not limited to, coding modes and parameter groups adopting various intra string matching coding modes.

Embodiment 2 of the First Type of Coding Mode and Parameter Group and the Second Type of Coding Mode and Parameter Group For an I image and a non-I image, the first type of coding mode and parameter group refers to a coding mode and parameter group all adopting an intra coding mode, and the second type of coding mode and parameter group refers to a coding mode and parameter group all not adopting the intra coding mode.

The coding mode and parameter group not adopting the intra coding mode include, but not limited to, coding modes and parameter groups adopting various intra matching coding modes and coding modes and parameter groups adopting various inter coding modes.

The coding mode and parameter group not adopting the intra coding mode include, but not limited to, coding modes and parameter groups adopting various intra block matching coding modes and coding modes and parameter groups adopting various inter coding modes.

The coding mode and parameter group not adopting the intra coding mode include, but not limited to coding modes and parameter groups adopting various intra string matching coding modes and coding modes and parameter groups adopting various inter coding modes.

Embodiment 3 of the First Type of Coding Mode and Parameter Group and the Second Type of Coding Mode and Parameter Group For an I image and a non-I image, the first type of coding mode and parameter group refers to a coding mode and parameter group all adopting a non-horizontal or non-vertical intra predictive coding mode, and the second type of coding mode and parameter group refers to a coding mode and parameter group all not adopting the non-horizontal or non-vertical intra predictive coding mode.

The coding mode and parameter group not adopting the non-horizontal or non-vertical intra predictive coding mode include, but not limited to, coding modes and parameter groups adopting a horizontal intra predictive coding mode, coding modes and parameter groups adopting a vertical intra predictive coding mode, coding modes and parameter groups adopting various intra matching coding modes and coding modes and parameter groups adopting various inter coding modes.

Embodiment 1 of Substantially Keeping the QP Difference Constant

There is a flag bit in the bitstream of each CU, the flag bits are equal to 1 or 0, indicating that a value of the QP difference changes or does not change in the current CUs respectively. The flag bits of two or more than two successively adjacent coding blocks shall not be equal to 1 simultaneously in bitstream.

Embodiment 2 of Substantially Keeping the QP Difference Constant

The QP difference is a constant within a range of a CTU including at least four CUs.

Embodiment 3 of Substantially Keeping the QP Difference Constant

The QP difference is a constant within a range of several CTUs.

Embodiment 4 of Substantially Keeping the QP Difference Constant

The QP difference is a constant within a range of one slice.

Embodiment 5 of Substantially Keeping the QP Difference Constant

The QP difference is a constant within a range of one tile.

Embodiment 6 of Substantially Keeping the QP Difference Constant

The QP difference is a constant within a range of one image.

Embodiment 7 of Substantially Keeping the QP Difference Constant

The QP difference is a constant within a range of one video sequence.

Embodiment 8 of Substantially Keeping the QP Difference Constant

A flag bit in header information of a CTU of the bitstream including the QP difference and the other coding results indicates that a value of the QP difference is kept constant in the current CTU.

Embodiment 9 of Substantially Keeping the QP Difference Constant

There is a flag bit for every several CTUs in the bitstream including the QP difference and the other coding results, and the flag bit indicates that a value of the QP difference is kept constant in multiple subsequent CTUs.

Embodiment 10 of Substantially Keeping the QP Difference Constant

A flag bit in header information of a slice of the bitstream including the QP difference and the other coding results indicates that a value of the QP difference is kept constant in the current slice.

Embodiment 11 of Substantially Keeping the QP Difference Constant

A flag bit in header information of a tile of the bitstream including the QP difference and the other coding results indicates that a value of the QP difference is kept constant in the current tile.

Embodiment 12 of Substantially Keeping the QP Difference Constant

A flag bit in header information of an image of the bitstream including the QP difference and the other coding results indicates that a value of the QP difference is kept constant in the current image.

Embodiment 13 about of Substantially Keeping the QP Difference Constant

A flag bit in header information of a sequence of the bitstream including the QP difference and the other coding results indicates that a value of the QP difference is kept constant in the current sequence.

Embodiment 1 of a Data Segment of the Bitstream Including the DP Difference and the Other Coding Results The bitstream data segment where multiple (n) CUs share one constant QP difference in the bitstream including the QP difference and the other coding results includes syntax elements which are loaded with the following information and sequentially arranged:

the QP difference, coding mode and parameter group+QP1+residual data of CU#1, coding mode and parameter group+QP1+residual data of CU#2, . . . , coding mode and parameter group+QP1+residual data of CU#n and coding mode and parameter group+QP1+residual data of CU#n+1.

Embodiment 2 of a Data Segment of the Bitstream Including the DP Difference and the Other Coding Results The bitstream data segment where multiple (n) CTUs share one constant QP difference in the bitstream including the DP difference and the other coding results includes syntax elements which are loaded with the following information and sequentially arranged:

the QP difference, coding mode and parameter group+QP1+residual data of CTU#1, coding mode and parameter group+QP1+residual data of CTU#2, . . . , coding mode and parameter group+QP1+residual data of CTU#n and coding mode and parameter group+QP1+residual data of CTU#n+1, . . . .

Embodiment 1 of the DP Difference

The QP difference is one non-negative integer, simultaneously used for three components Y, U and V or G, B and R of an image.

Embodiment 2 of the DP Difference

The QP difference includes three non-negative integers, used for the three components Y, U and V or G, B and R of the image respectively.

From the above, the embodiment of the present disclosure achieves technical effects as follows: the problem that there is yet no effective technical solution capable of adaptively decoding the continuous-tone content and the discontinuous-tone content in the related art is solved, and an optimal coding mode may further be adaptively selected to code a current coding block according to a target bit rate for the current coding block.

From the above descriptions about the implementation modes, those skilled in the art may clearly know that the method of the embodiment may be implemented in a manner of combining software and a necessary universal hardware platform, and may also be implemented by hardware, but the former implementation mode is preferred under many conditions. Based on such an understanding, the technical solutions of the present disclosure substantially or parts making contributions to a conventional art may be embodied in form of software product, and the computer software product is stored in a storage medium (such as a Read-Only Memory (ROM), a Random Access Memory (RAM), a magnetic disk and a compact disc), including a plurality of instructions configured to enable a piece of computer equipment (which may be a mobile phone, a computer, a server, network equipment or the like) to execute the methods of each embodiment of the present disclosure.

In another embodiment, software is further provided, which is configured to execute the technical solutions described in the abovementioned embodiments and preferred implementation modes.

In another embodiment, a storage medium is further provided, in which the abovementioned software is stored, the storage medium including, but not limited to: a compact disc, a floppy disk, a hard disk, an erasable memory and the like.

It is important to note that terms "first", "second" and the like in the specification, claims and drawings of the present disclosure are configured to distinguish similar objects, and are not required to describe specific orders or sequences. It should be understood that the objects used in such a manner may be exchanged to make it possible to implement the described embodiments of the present disclosure in sequences except those shown or described here under proper conditions. In addition, terms "include" and "have" and any transformations thereof are intended to cover exclusive inclusions, and for example, a process, method, system, product or equipment including a series of steps or elements is not limited to those steps or elements which are clearly listed, but may include other steps or elements which are not listed or intrinsic for the process, method, product or equipment.

Obviously, those skilled in the art should know that each component of each component or step of the present disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, the shown or described steps may be executed in sequences different from those described here in some circumstances, or may form each integrated circuit component respectively, or multiple components or steps therein may form a single integrated circuit component for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

The technical solutions provided by the embodiment of the present disclosure may be applied to an image coding or decoding process, and all the coding modes and the parameter groups are divided into two types: a first type of coding mode and parameter and a second type of coding mode and parameter group, and a proper coding mode is selected from the two types of coding modes and parameter groups according to reconstruction quality for the coding block to further code the image during optimal coding of the coding block is adopted, so that the problem that there is yet no effective technical solution capable of adaptively coding the continuous-tone content and the discontinuous-tone content according to different reconstruction qualities and distortion degrees in the related art is solved, and the optimal coding mode may further be adaptively selected to code the current coding block according to the target bit rate for the current coding block.

What is claimed is:

1. A method for coding an image, comprising:
   dividing coding mode parameters and parameter groups of one coding block into multiple types of coding mode parameters and parameter groups corresponding to the multiple types of coding mode parameters according to a specified rule respectively;
   determining Quantization Parameters (QPs), comprised in the multiple types of coding mode parameters according to a preset target bit rate;
   determining a QP of the coding block according to reconstruction quality for the coding block;
   selecting a coding mode parameter to be used from the multiple types of coding mode parameters according to the QP of the coding block;
   setting a parameter group corresponding to the selected coding mode parameter, and calculating a QP difference;
   encoding the coding block according to the selected coding mode parameter and the QP of the coding block; and
   writing the selected coding mode parameter, the parameter group used by the coding block and the QP difference into a video bitstream.

2. The coding method as claimed in claim 1, wherein determining the QPs comprised in the multiple types of coding mode parameters according to the preset target bit rate comprises:
   determining multiple picture layer and/or slice layer QPs to be used in a coding process; and
   determining the QPs comprised in the multiple types of coding mode parameters according to a rule as follows: each of the multiple types of coding mode parameters comprises at least one picture layer and/or slice layer QP.

3. The coding method as claimed in claim 2, after determining the multiple picture layer and/or slice layer QPs, further comprising:
   writing the multiple determined picture layer and/or slice layer QPs into a parameter set bitstream and/or a slice-layer header information bitstream.

4. The coding method as claimed in claim 1, further comprising:
   acquiring difference values between the picture layer and/or slice layer QPs and a preset reference QP, and writing the difference value into the video bitstream.

5. The coding method as claimed in claim 1, wherein the parameter group comprises at least one of following information:
   selection indication information for the multiple types of coding mode parameters, prediction mode parameters of the coding block and transform mode parameters of the coding block.

6. The coding method as claimed in claim 1, wherein calculating the QP difference comprises:

obtaining the QP difference according to difference values between the QP of the coding block and the picture layer and/or slice layer QPs comprised in the coding mode parameters indicated by parameter group information; or, obtaining the QP difference according to a difference value between the QP of the coding block and a picture layer and/or slice layer QP used by the coding block as a default.

7. A method for decoding an image, comprising:
decoding a video bitstream to obtain at least one of following information: a decoding mode parameter, a parameter group and a Quantization Parameter (QP) difference, wherein the decoding mode parameter comprises: multiple types of decoding mode parameters, the parameter group comprises control information for selecting one type of decoding mode parameter from the multiple types of decoding mode parameters, and the selected decoding mode parameter is used for decoding a decoding block;
determining a decoding mode parameter for decoding the decoding block from the multiple types of decoding mode parameters according to the control information of the parameter group and/or a preset corresponding relationship between parameter groups and the multiple types of decoding mode parameters;
determining a QP for decoding the decoding block according to the determined decoding mode parameter and the QP difference; and
decoding the decoding block according to the determined decoding mode parameter and the QP.

8. The decoding method as claimed in claim 7, wherein the decoding mode parameter comprise: the multiple types of decoding mode parameters, wherein each of the multiple types of decoding mode parameters comprises: picture layer and/or slice layer QPs to be used in a decoding process.

9. The decoding method as claimed in claim 8, further comprising:
decoding a parameter set and/or slice header information bitstream to obtain multiple picture layer and/or slice layer QPs, wherein each of the multiple types of decoding mode parameters comprises at least one picture layer and/or slice layer QP.

10. The decoding method as claimed in claim 7, further comprising:
decoding a block layer bitstream corresponding to the decoding block to obtain the parameter group and the QP difference;
selecting, according to the parameter group, one type of decoding mode parameter from the multiple types of decoding mode parameters to decode the decoding block; and
setting a QP of the decoding block to be a sum or difference value of the QP difference and the picture layer and/or slice layer QP comprised in the selected decoding mode parameter.

11. The decoding method as claimed in claim 10, wherein the parameter group comprises at least one of following information:
selection indication information for the multiple types of decoding mode parameters, prediction mode parameters of the decoding block and transform mode parameters of the decoding block.

12. The decoding method as claimed in claim 11, wherein determining the picture layer and/or slice layer QPs comprises:

acquiring difference values between the picture layer and/or slice layer QPs and a preset reference QP, and setting the image-layer and/or slice layer QPs to be difference values or sum values of the difference values and the preset reference QP.

13. A device for coding an image, comprising:
a classification component, configured to divide coding mode parameters and parameter groups of one coding block into multiple types of coding mode parameters and parameter groups corresponding to the multiple types of coding mode parameters according to a specified rule respectively;
a first determination component, configured to determine Quantization Parameters (QPs), comprised in the multiple types of coding mode parameters according to a preset target bit rate;
a second determination component, configured to determine a QP of the coding block according to reconstruction quality for the coding block;
a setting component, configured to select a coding mode parameter to be used from the multiple types of coding mode parameters according to the QP of the coding block, and set a parameter group corresponding to the selected coding mode parameter;
a calculation component, configured to calculate a QP difference; and
a writing component, configured to write the coding mode parameter, the parameter group used by the coding block and the QP difference into a video bitstream,
wherein the device is configured to encode the coding block according to the selected coding mode parameter and the QP of the coding block.

14. The coding device as claimed in claim 13, wherein the first determination component comprises:
a first determination element, configured to determine multiple picture layer and/or slice layer QPs to be used in a coding process; and
a second determination component, configured to determine the QPs comprised in the multiple types of coding mode parameters according to a rule as follows: each of the multiple types of coding mode parameters comprises at least one picture layer and/or slice layer QP.

15. The coding device as claimed in claim 14, wherein the writing component is further configured to write the determined multiple picture layer and/or slice layer QPs into a parameter set bitstream and/or a slice-layer header information bitstream.

16. The coding device as claimed in claim 13, further comprising:
an acquisition component, configured to acquire difference values between the picture layer and/or slice layer QPs and a preset reference QP, wherein
the writing component is further configured to write the difference values into the video bitstream.

17. The coding device as claimed in claim 13, wherein the parameter group divided by the classification component comprises at least one of following information: selection indication information for the multiple types of coding mode parameters, prediction mode parameters of the coding block and transform mode parameters of the coding block.

18. The coding device as claimed in claim 13, wherein the calculation component is configured to obtain the QP difference according to difference values between the QP of the coding block and the picture layer and/or slice layer QPs comprised in the coding mode parameters indicated by parameter group information; or, obtain the QP difference according to a difference value between the QP of the coding block and a picture layer and/or slice layer QP used by the coding block as a default.

19. A device for decoding an image, comprising:
a decoding component, configured to decode a video bitstream to obtain at least one of following information: a decoding mode parameter, a parameter group and a Quantization Parameter (QP) difference, wherein the decoding mode parameter comprises: multiple types of decoding mode parameters, the parameter group comprises control information for selecting one type of decoding mode parameter from the multiple types of decoding mode parameters, and the selected decoding mode parameter is used for decoding a decoding block;
a determination component, configured to:
determine a decoding mode parameter for decoding the decoding block from the multiple types of decoding mode parameters according to the control information of the parameter group and/or a preset corresponding relationship between parameter groups and the multiple types of decoding mode parameters,
determine a QP for decoding the decoding block according to the determined decoding mode parameter and the QP difference, and
wherein the decoding component is further configured to decode the decoding block according to the determined decoding mode parameter and the QP.

20. The decoding device as claimed in claim 19, wherein the decoding mode parameter decoded by the decoding component comprise: the multiple types of decoding mode parameters, wherein each of the multiple types of decoding mode parameters comprises: picture layer and/or slice layer QPs to be used in a decoding process.

21. The decoding device as claimed in claim 20, wherein the decoding component is further configured to decode a parameter set and/or slice header information bitstream to obtain multiple picture layer and/or slice layer QPs, wherein each of the multiple types of decoding mode parameters comprises at least one picture layer and/or slice layer QP.

22. The decoding device as claimed in claim 19, wherein
the decoding component is further configured to parse a block layer bitstream corresponding to the decoding block to obtain the parameter group and the QP difference; and
the device further comprises: a selection component, configured to select one type of decoding mode parameter from the multiple types of decoding mode parameters to decode the decoding block according to the parameter group; and
a setting component, configured to set a QP of the decoding block to be sum values or difference values of the QP difference and the picture layer and/or slice layer QP comprised in the selected decoding mode parameter.

23. The decoding device as claimed in claim 19, wherein the parameter group obtained by parsing by the decoding component comprises at least one of following information: selection indication information for the multiple types of decoding mode parameters, prediction mode parameters of the decoding block and transform mode parameters of the decoding block.

24. The decoding device as claimed in claim 19, wherein the determination component comprises:
an acquisition element, configured to acquire a difference value between the picture layer and/or slice layer QPs and a preset reference QP; and
a setting element, configured to set the image-layer and/or slice layer QPs to be difference value or sum value of the difference values and the preset reference QP.

* * * * *